(12) United States Patent
Mace et al.

(10) Patent No.: US 9,573,041 B2
(45) Date of Patent: Feb. 21, 2017

(54) METHOD FOR COMPUTING A PARAMETER REPRESENTATIVE OF THE TECHNICAL LEVEL OF A TENNIS PLAYER

(71) Applicants: Pierre Mace, Lyons (FR); Fabien Gauthier, Lyons (FR)

(72) Inventors: Pierre Mace, Lyons (FR); Fabien Gauthier, Lyons (FR)

(73) Assignee: BABOLAT VS, Lyons (FR)

( * ) Notice: Subject to any disclaimer, the term of this patent is extended or adjusted under 35 U.S.C. 154(b) by 259 days.

(21) Appl. No.: 14/460,916

(22) Filed: Aug. 15, 2014

(65) Prior Publication Data
US 2015/0057778 A1 Feb. 26, 2015

(30) Foreign Application Priority Data
Aug. 20, 2013 (FR) ..................................... 13 58084

(51) Int. Cl.
*A63F 13/00* (2014.01)
*A63B 69/38* (2006.01)
*G09B 19/00* (2006.01)

(52) U.S. Cl.
CPC ........... *A63B 69/38* (2013.01); *G09B 19/0038* (2013.01)

(58) Field of Classification Search
CPC ...... G06F 3/0481; G06T 11/206; A63B 69/38; G06Q 10/0639
See application file for complete search history.

(56) References Cited

U.S. PATENT DOCUMENTS

| 5,757,266 A | 5/1998 | Rider et al. |
| 2011/0183787 A1 | 7/2011 | Schwenger et al. |
| 2014/0206481 A1 | 7/2014 | Zuger |

FOREIGN PATENT DOCUMENTS

WO 2013/029191 A1 3/2013

OTHER PUBLICATIONS

FR Search Report, dated Jan. 15, 2014, from corresponding FR application.

*Primary Examiner* — Reginald Renwick
(74) *Attorney, Agent, or Firm* — Young & Thompson

(57) ABSTRACT

Method for calculating a parameter (P) representing a tennis player's technical level during a series of strokes includes: a) determining, for each executed stroke, an impact zone of the stroke on the stringed zone of a tennis racquet used by the player; b) determining, for each executed stroke, the type of stroke, with the type being chosen from a list including at least two type of strokes; c) using the impact zones determined in step a) and types of strokes determined in step b) for the series of strokes, determining a zone index for each type of stroke; d) using the zone indexes calculated in step c), calculating the parameter value, using the following formula:

$$P = \frac{\sum_{i=1}^{C} Z_i \times N_i}{\sum_{i=1}^{C} N_i}$$

where C is the number of stroke types, Zi, with i between 1 and C, is the zone index, and Ni is the number of strokes executed per type of stroke i.

10 Claims, 2 Drawing Sheets

METHOD FOR COMPUTING A PARAMETER REPRESENTATIVE OF THE TECHNICAL LEVEL OF A TENNIS PLAYER

FIELD OF THE INVENTION

The invention relates to a method for calculating a parameter representing the technical level of a tennis player.

BACKGROUND OF THE INVENTION

In the practice of tennis, it is advantageous to be able to analyse the performance of a player, for example for the purpose of evaluating and/or improving his game technique. The level of the player is characterised in particular by his capacities to perform gestures and hits in a reproducible manner, while mastering the most types of strokes possible. Indeed, the more technical control the player has, the more he will manage to hit the same stroke with the same stringed zone of the racket.

SUMMARY OF THE INVENTION

The invention proposes a method for calculating a parameter representing the technical level of a tennis player by studying the variety and the regularity of the strokes executed by this player, based on measurements taken during the game.

To this effect, the invention has for object a method for calculating a parameter representing the technical level of a tennis player during a series of strokes. This method is wherein it comprises the following steps:

a) determining, for each stroke executed during the series of strokes, an zone of impact of the stroke on the stringed zone of a tennis racket that the player is using;

b) determining, for each stroke executed during the series of strokes, the type of this stroke, with the type of stroke being chosen from among a list comprising at least two types of strokes;

c) using the zones of impact determined in the step a) and the types of strokes determined in the step b) for the series of strokes, determining a zone index for each type of stroke of the series of strokes;

d) using the zone indexes calculated in the step c), calculating the value of the parameter by using the following formula:

$$P = \frac{\sum_{i=1}^{C} Z_i \times N_i}{\sum_{i=1}^{C} N_i}$$

where P is the representative parameter,

C is the number of types of strokes, $Z_i$, with i between 1 and C, is the zone index for each stroke, and $N_i$ is the number of strokes carried out for each type of stroke i.

Thanks to the invention, the tennis player has a means for assessing his faculty of reproducing the same gestures for each type of stroke and his mastery of the various types of tennis strokes. The more the player manages to hit the ball with the same zone of the string bed of the racket for each type of stroke, the higher the value of the parameter will be, certifying the technical level of the player.

According to advantageous but not mandatory aspects of the invention, such a method can incorporate one or several of the following characteristics, taken in any technically permissible combination:

The parameter is calculated over a series of strokes comprising a minimum number of strokes for each type of stroke.

The list of the types of strokes comprises at least six types of strokes.

The list of the types of strokes comprises at least eight types of strokes among which: the flat forehand stroke, the forehand topspin stroke, the forehand slice stroke, the flat backhand stroke, the backhand topspin, the backhand slice, the flat serve and the spin serve.

When for one or several types of strokes, the player has not executed a threshold number of strokes, with the zone index or indexes corresponding to this or to these types of strokes is multiplied by a weighting coefficient chosen according to the number of strokes executed for this or for these types of strokes, with the weighting coefficient increasing with the number of strokes.

The stringed zone of the racket is divided into at least two zones, preferably into five zones.

The method comprises, before the step b), a prior step consisting in choosing the types of strokes from the list of types of strokes.

Each zone index is multiplied by a calibration coefficient making it possible to standardise this zone index on a scale of which the maximum value corresponds to the virtual performance of a player who hits all of the strokes of the same type in the same zone of the stringed zone.

In the step b), the type of stroke executed is determined according to the linear accelerations and the angular speeds of the racket.

In the step a), the impact zone of each stroke is determined by measurements of vibrations in the racquet and/or according to the linear accelerations and angular speeds of the racket.

The method comprises a further step consisting in calculating the playing rate of the player during the series of strokes, and in weighting the value of the parameter on the basis of the value of the playing rate.

The method comprises a further step consisting in calculating the average power developed by the player during the series of strokes, and in weighting the value of the parameter on the basis of the value of the average power.

BRIEF DESCRIPTION OF THE DRAWINGS

The invention shall be better understood and other advantages of the latter shall appear more clearly when reading the following description of a method for calculating in accordance with the invention, given solely by way of example and made in reference to the annexed drawings wherein:

FIG. 1 shows a tennis racket 1, that comprises, conventionally, a grip 2 connected to a head T including a frame 4 inside of which is tensioned a stringed zone 8, formed of various transverse and longitudinal strings. The head T further comprises two connecting branches 6 that extend in a divergent manner from the grip 2 to the frame 4.

Figure 1:
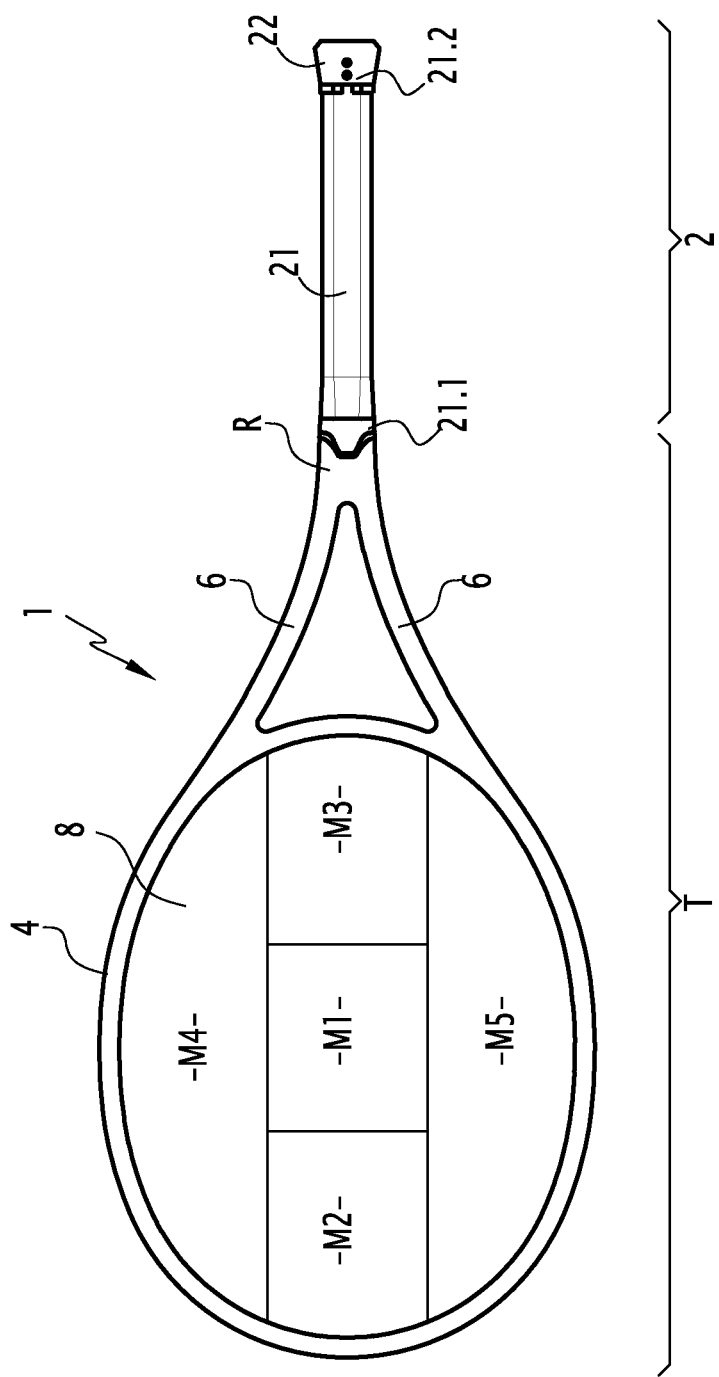
FIG. 1 is a front view of a racquet allowing for the implementation of the method of the invention.
Figure 2:
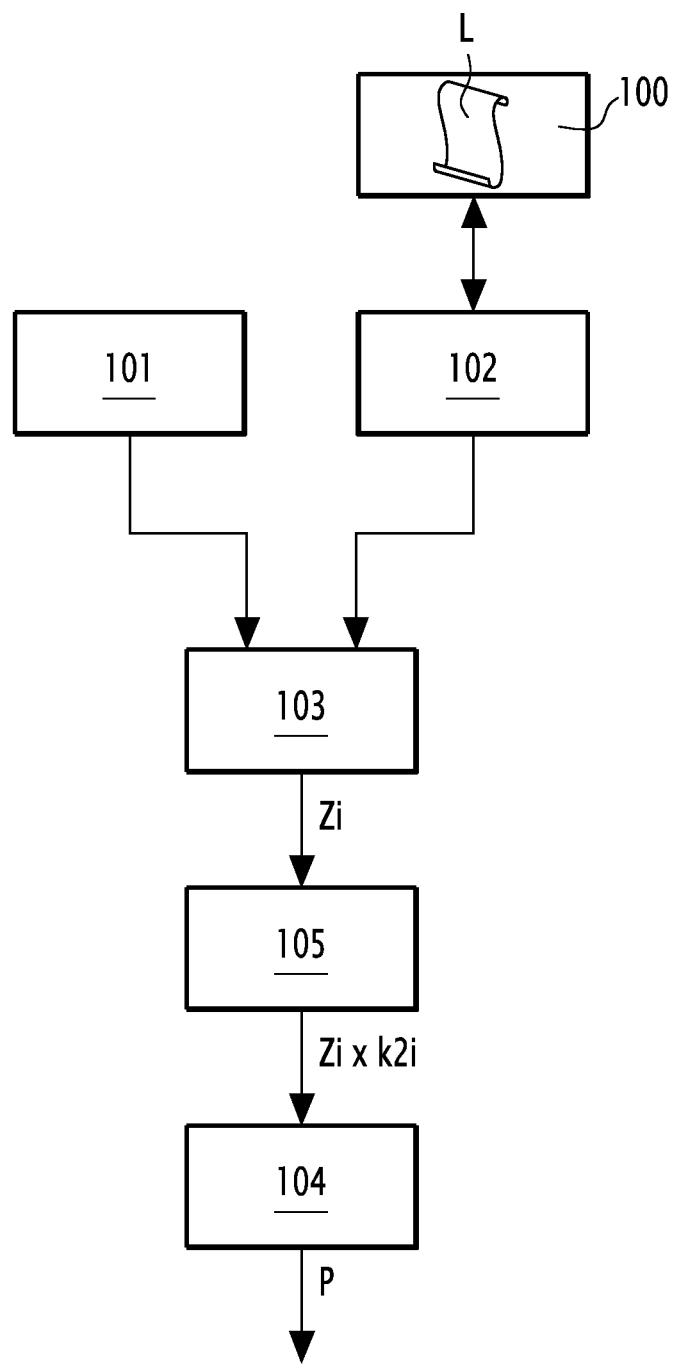
FIG. 2 is a block diagram of the method of the invention.

The grip 2 comprises a generally tubular body 21, made for example of carbon. Conventionally, the body 21 is covered with a thickness of foam surrounded by a grip, in order to improve the grasping of the grip. The body 21 of the grip 2 comprises a proximal longitudinal end 21.1, located on the side of the stringed zone 8 and connected to the connecting branches 6, and a distal longitudinal end 21.2, free and opposite the end 21.1. The end 21.2 is covered by a heel 22, generally designated by the term "butt cap", which allow the hand of the player to not slide outside of the grip 2.

The racquet 1 is provided with a system for measuring game data, not shown, comprising at least one measurement sensor, for example a vibration sensor.

The system for measuring makes it also possible to determine, during the hitting of a ball with the racquet 1, the linear acceleration and the angular speed of the racket, according to three directions perpendicular to each other, fixed in relation to a terrestrial reference. For example, the system for measuring may include a triple-axis accelerometer and a triple-axis gyrometer.

The rest of the description relates to a method for calculating a parameter P representing the technical level of a tennis player, by means of the racquet 1, which to this end comprises a calculating unit.

During a series of strokes carried out by the player, game data is measured by the system for measuring and transmitted to the calculating unit. The gestures that do not correspond to any stroke, for example, when the player bounces a ball on the ground, are detected and are not taken into account when defining a series of strokes.

In a first step 101, for each stroke executed, the impact zone of the ball on the stringed zone 8 is determined according to the measurements of the vibration sensor. The stringed zone 8 can be divided into several zones shown in FIG. 1: one generally rectangular central zone M1, and four peripheral zones M2, M3, M4 and M5 which divide the remaining portion of the stringed zone 8 into four zones. One zone M2 is located in the extension of the central zone M1 according to the axis of the grip 2 towards the end of the frame 4 opposite the grip 2, one zone M3 is located opposite the zone M2 in relation to the central zone M1 according to the axis of the grip 2 i.e. located between the zone M1 and the grip 2, and two zones M4 and M5 are located respectively on each side of the zones M1, M2 and M3.

Alternatively, the breakdown of the zones and the number of zones can be different, with the stringed zone 8 being at least divided into two zones M1 and M2. By way of example, the central zone M1 can be circular and the zones M2 to M4 can define four quarters evenly distributed around the central zone M1.

Alternatively, the impact zone of the ball on the stringed zone can be determined according to the linear accelerations and the angular speeds of the racket 1, in place of or jointly with the measurements of the vibration sensor.

In a second step 102, for each stroke executed, the type of stroke wherein this stroke can be classed is determined according to linear accelerations and angular speeds of the racket 1 determined by the system for measuring.

The type of stroke is chosen from among a list L comprising at least two strokes, for example the forehand and the backhand. Advantageously, the list L of the types of strokes comprises at least six strokes among which the flat forehand stroke, i.e. without spin, the forehand topspin stroke, i.e. with a spin imprinted by a rising trajectory of the racquet 1, the forehand slice stroke, i.e. with a spin imprinted by a descending trajectory of the racquet 1, the flat backhand, the backhand topspin and the backhand slice.

Advantageously the method according to the invention comprises a prior step 100 during which the list of the types of strokes to be distinguished is chosen, for example by the player before a series of strokes.

Preferably, the list L of the types of strokes includes eight strokes, among which the aforementioned six strokes to which is added the flat serve and the spin serve. Alternatively, the list L of the types of strokes can include more than eight strokes.

The number of strokes on the list of strokes L is assigned the number C. In the case where the eight types of strokes listed hereinabove are detected, C is equal to 8. i denotes a variable assigned to a type of stroke, i being between 1 and C. $N_i$ denotes the number of strokes of a certain type carried out. If the value i=1 is assigned to the flat forehand stroke, $N_1$ is the number of flat forehand strokes carried out during the series of strokes. The sum of the numbers of strokes $N_i$ executed in each type of stroke, for i=1 to C, is equal to the total number of strokes executed during the series of strokes studied.

In a third step 103, using the zones of impact determined in the step 101 and the types of strokes determined in the step 102, a zone index $Z_i$ is determined for each type of stroke i of the series of strokes carried out. If the value i=1 is assigned to the flat forehand stroke, the zone index $Z_1$ will correspond to the zone index Z calculated using all of the flat forehand strokes carried out during the series of strokes studied. The zone index $Z_i$ for each stroke is the standard deviation of the probabilities of impact in the different zones M1 to M5 of the stringed zone 8. The level of the player is good when the ball impacts the stringed zone 8 always in the same zone for each type of stroke, generally the central zone M1 for a flat forehand stroke. In order to calculate the standard deviation, for each zone M1 to M5 the total number of times n1, n2, n3, n4 or n5 where the ball has hit this zone is calculated. The sum of the numbers n1 to n5 is equal to the total number of hits $N_i$ for each type of stroke i.

The probability of impact p1 to p5 of the ball in each zone M1 to M5 is then calculated. For example, for the first zone M1, the probability p1 is equal to the number of times n1 where the ball has hit the zone M1, divided by the total number of hits N. Take for example p1=0.55, which means that 55% of the balls hit impacted the zone Z1.

The sum of the probabilities of impact p1 to p5 is equal to 1. For example, p1=0.55, p2=0.3, p3=0.05, p4=0.05 and p5=0.05.

Optionally, each zone index $Z_i$ can be multiplied by a calibration coefficient k1 making it possible to standardise the zone index $Z_i$, i.e. to calibrate the zone index $Z_i$ in order to bring it onto a scale of which the maximum value corresponds to the virtual performance of a player who hits all of the strokes of the same type in the same zone of the stringed zone 8.

This maximum value is not the same according to the number of zones M1 to M5 that divides the stringed zone. Indeed, the higher the number of zones M1 to M5 is, the more difficult it is for the player to always hit the ball in the same zone. If it is sought to assign to the scale a maximum value of 1, the calibration coefficient k1 is defined by the relation $k1=1/\sigma_M$, with $\sigma_M$ the standard deviation of the probabilities of impact p1 to p5 of a perfect game, for which the ball hits only the zone M1 (p1=1 and p2=p3=p4=p5=0). In the example given, $\sigma_M$=0.44 and k1=1/0.44≈2.272.

Once the zone index $Z_i$ is calculated in the step 103 for each type of stroke i, the value of the parameter P is calculated, in a step 104, by using the following formula:

$$P = \frac{\sum_{i=1}^{C} Zi \times Ni}{\sum_{i=1}^{C} Ni}$$

The parameter P is calculated by dividing the sum of the products of the indexes Zi by the number of strokes Ni for each type of stroke i, by the total number of strokes of the series of strokes.

The parameter P is more preferably calculated over a series of strokes comprising a minimum number of strokes for each type of stroke. For example, this minimum number of strokes can be two strokes.

When for one or several types of strokes, the player has not executed at least ten strokes, the zone index or indexes Zi that correspond to this or to these types of strokes are weighted. In a step 105 prior to the step 104, the zone indexes Zi concerned are multiplied by a weighting coefficient k2i chosen according to the number of strokes Ni carried out for these types of strokes i. The weighting coefficient k2i increases with the number of strokes Ni. For example, if the player has only executed 9 flat forehand strokes, the zone index Z1 corresponding to the flat forehand strokes is multiplied by a weighting coefficient k21 by a value equal to 0.95. If the player has only executed 8 flat forehand strokes, the weighting coefficient k21 has a value equal to 0.8. For 7, 6 and 5 strokes, this coefficient k21 respectively takes the values 0.6, 0.45 and 0.3. And so forth, with a decrease in the coefficient according to the decrease in the number of strokes.

Alternatively, the number of strokes by type below which the step 105 is carried out can be different from 10.

The parameter P reflects the capacity of a player to hit the strokes in the same zones for each type of stroke and to use a varied range of strokes. If for example a first player hits almost all of his flat forehand strokes in the same zone but uses few forehand strokes with spins, his parameter P will not be as high as that for a second player who hits his forehand stroke with a greater variety of spins, while still hitting almost all of his strokes in the same zone.

According to a non-shown embodiment of the invention, the method for calculating the parameter P may comprise a further step consisting in calculating the playing rate of the player during the series of strokes. The playing rate corresponds, for example, to the ratio of the number of strokes to the effective playing time. The value of the parameter P is weighted on the basis of the value of the playing rate. Thus, the parameter P reflects an additional aspect of the technical level of the player, which is his ability to maintain his accuracy of impact zones on the stringed zone during high intensity ball exchanges.

According to another non-shown embodiment of the invention, the method for calculating the parameter P may comprise a further step consisting in calculating the average power developed by the player during the series of strokes.

The average power is obtained by calculating the average value of the powers developed by the player at each stroke of the series of strokes. The power developed at each stroke is calculated on the basis of a ratio between the angular speed and the linear acceleration of the racquet measured by the system for measuring. The value of the parameter P is then weighted on the basis of the value of the average power. Thus, the parameter P reflects an additional aspect of the technical level of the player, which is his ability to maintain his accuracy of impact zones on the stringed zone while playing strokes at a high power.

The features of the embodiments and variant described here above can be combined to obtain new embodiments of the invention.

The invention claimed is:
1. A method for calculating a parameter representing the technical level of a tennis player during a series of strokes in which the tennis player strikes a tennis ball with a racquet, the method comprising the following steps:
 a) carrying a series of strokes with the racquet striking the ball, the racquet comprising a grip, a head connected to the grip, and a system for measuring game data, the head including a frame and a tensioned stringed zone inside the frame, the tensioned stringed zone being divided into at least two zones, the system for measuring game data including a vibration sensor, a triple axis accelerometer and a triple axis gyrometer;
 b) during the series of strokes, measuring vibrations, linear acceleration and angular speed of the racquet during each stroke using the vibration sensor, the triple axis accelerometer and the triple axis gyrometer included in the the system for measuring game data;
 c) determining, for each stroke executed during the series of strokes, and using the at least one of the group consisting of i) the vibrations measured at step b) and ii) the linear accelerations and the angular speeds measured at step b), a zone of impact of the stroke on the tensioned stringed zone of the tennis racquet that the player is using, among the at least two zones into which the tensioned stringed zone of the racquet is divided;
 d) determining, for each stroke executed during the series of strokes, and using the linear accelerations and the angular speeds measured at step b), the type of each stroke, with the type of each stroke being chosen from a list comprising at least two types of strokes chosen from a list comprising at least the forehand and the backhand;
 e) using zones of impact determined in the step c) and the types of strokes determined in the step d) for the series of strokes, determining a zone index for each type of stroke of the series of strokes,
 f) using the zone indexes calculated in the step e), calculating the value of the parameter by using the following formula:

$$P = \frac{\sum_{i=1}^{C} Zi \times Ni}{\sum_{i=1}^{C} Ni}$$

where:
 P is the representative parameter,
 C is the number of types of strokes,
 Zi, with i between 1 and C, is the zone index for each stroke, and
 Ni is the number of strokes carried out for each type of stroke i.
2. The method according to claim 1, wherein the parameter is calculated over a series of strokes comprising a minimum number of strokes for each type of stroke.

3. The method according to claim 1, wherein the list of types of strokes comprises at least six types of strokes.

4. The method according to claim 3, wherein the list of types of strokes comprises at least eight types of strokes among which: the flat forehand stroke, the forehand topspin stroke, the forehand slice stroke, the flat backhand, the backhand topspin, the backhand slice, the flat serve and the spin serve.

5. The method according to claim 1, wherein when for one or several types of strokes, the player has not executed a threshold number of strokes, the zone index or indexes corresponding to this or to these types of strokes is multiplied by a weighting coefficient chosen according to the number of strokes executed for this or for these types of strokes, with the weighting coefficient increasing with the number of strokes.

6. The method according to claim 1, wherein the tensioned stringed zone of the racket is divided into five zones.

7. The method according to claim 1, wherein it comprises, before the step d), a prior step consisting in choosing the types of strokes of the list of types of strokes.

8. The method according to claim 1, wherein each zone index is multiplied by a calibration coefficient making it possible to standardise this zone index on a scale of which the maximum value corresponds to the virtual performance of a player who hits all of the strokes of the same type in the same zone of the tensioned stringed zone.

9. The method according to claim 1, wherein it comprises a further step consisting in calculating the playing rate of the player during the series of strokes, and in weighting the value of the parameter (P) on the basis of the value of the playing rate.

10. The method according to claim 1, wherein it comprises a further step consisting in calculating the average power developed by the player during the series of strokes, and in weighting the value of the parameter (P) on the basis of the value of the average power.

* * * * *